J. W. Eardly,
Corn Planter,
No. 87,651. Patented Mar. 9. 1869.
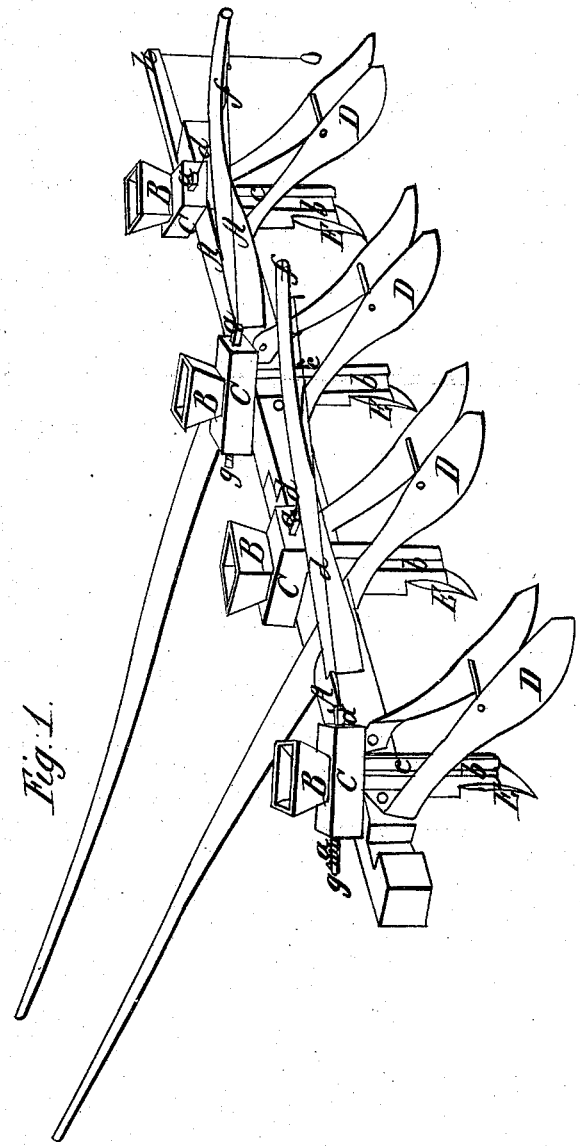
Witnesses;
Inventor;
James W. Eardly

JAMES W. EARDLY, OF CASCADE, MICHIGAN.

Letters Patent No. 87,651, dated March 9, 1869.

IMPROVEMENT IN CORN-PLANTERS.

The Schedule referred to in these Letters Patent and making part of the same.

Be it known that I, JAMES W. EARDLY, of Cascade, in the county of Kent, and State of Michigan, have invented a new and useful Improvement in Corn-Planters; and I do hereby declare that the following is a full and exact description thereof, reference being had to the accompanying drawings, and to the letters of reference marked thereon.

The nature of my invention consists in providing the corn-marker bar, heretofore patented to me, with suitable devices and attachments, whereby corn or other grain may be planted at the same time that the marker is making the transverse marks across the field, or the machine may be used simply as a corn-marker, as desired.

In order to enable others skilled in the art to construct and use my invention, I will now describe its construction and operation.

In the drawings—

Figure 1 is a perspective view of the corn-marker, heretofore patented to me, with my improvement for planting added thereto.

Figure 2 is a plan view of an adjustable slide, for the purpose of controlling the planting and regulating the number of kernels to each hill.

A A, fig. 1, represent the two halves of the marker and planter-bar.

b b b b represent the markers, with small plows, E E E E, attached to their lower ends, and with conductors, c c c c, running lengthwise on their rear sides.

B B B B represent grain-boxes, with openings in their bottoms, communicating with the conductors, and covered by slides.

The slides a, fig. 2, play in the boxes C C C C, fig. 1, and are held closed by spiral springs g, fig. 1.

d d d d represent rods reaching from the slides to the handled rods f f on the handles of the machine.

D D D D represent four pairs of followers, for the purpose of covering the grain.

Small transverse rods, near the bottom of the conductors, serve to scatter the kernels of grain.

This machine may be hung on three wheels, one in the centre, and one on either end, with any of the known devices for regulating the depth of the planting, if desired.

In operating this machine, the ground is first marked out in rows one way, the operator using it precisely as set forth in the specification describing my corn-marker, before referred to.

The followers D may be dispensed with during this part of the operation, if desired.

The corn is now placed in the boxes B, and we proceed as before, only in a transverse direction.

At every crossing of the rows first marked, the corn is dropped immediately behind the plows, by simply giving a quick pull on the handled rods f f, causing a momentary opening of the slides a, releasing the corn, which, dropping down the tubes b, and striking the slight obstructions in the tubes, serve to scatter the kernels laterally, while the motion of the machine will sufficiently prevent too many kernels from falling in one place.

The followers D securely cover the grain by pressing the loose soil over it.

The spring g on the slide a immediately closes the apertures leading from the grain-boxes, when the momentary pressure is withdrawn from the handled rods f f.

The manner of regulating the number of kernels to each hill is clearly shown by the adjustable small slide b', with its slot and set-screw, forming a part of the slide a, fig. 2.

The difficulty heretofore met with in planting corn, with all machines, has arisen from attempts to make the machine govern the distance apart of the hills. Rows running true and straight in one direction can be thus planted, but to make them true and straight in both directions has been found to be impossible in such way, from the fact that the least inequality of surface to be planted increases or diminishes the distance, and hence occasions a discrepancy between the rows running in the direction in which the machine is moving and the opposite direction.

This difficulty is overcome by the use of this machine, because it enables the operator to control and determine the exact location of each and every hill, while, by a very simple device, any desirable number of kernels may be deposited in each and every intersection of the rows.

I claim the combination of the bar A A and its adjustable marker b, with the box B, adjustable slide a, and handles and handled rods f f, when constructed and used as and for the purposes set forth.

In testimony that I claim the foregoing, I have hereunto set my hand, this 31st day of December, A. D. 1868.

JAMES W. EARDLY.

Witnesses:
MARTIN METCALF,
THOMPSON SINCLAIR.